(12) United States Patent
Moussavi et al.

(10) Patent No.: US 8,098,941 B2
(45) Date of Patent: Jan. 17, 2012

(54) METHOD AND APPARATUS FOR PARALLELIZATION OF IMAGE COMPRESSION ENCODERS

(75) Inventors: Farshid Moussavi, Oakland, CA (US);
Sheng Lin, Sunnyvale, CA (US);
Thomas Kopet, San Jose, CA (US);
Aman Jabbi, San Francisco, CA (US)

(73) Assignee: Aptina Imaging Corporation, George Town (KY)

( * ) Notice: Subject to any disclaimer, the term of this patent is extended or adjusted under 35 U.S.C. 154(b) by 1323 days.

(21) Appl. No.: 11/730,718

(22) Filed: Apr. 3, 2007

(65) Prior Publication Data

US 2008/0247653 A1    Oct. 9, 2008

(51) Int. Cl.
*G06K 9/36* (2006.01)
(52) U.S. Cl. .................. 382/232; 382/166; 382/246
(58) Field of Classification Search .............. 382/232, 382/233, 234, 248–251, 305, 128, 166, 246; 375/240, 240.3, 240.12, 240.14, 240.18, 375/240.21
See application file for complete search history.

(56) References Cited

U.S. PATENT DOCUMENTS

| | | | |
|---|---|---|---|
| 6,259,819 B1 * | 7/2001 | Andrew et al. | 382/248 |
| 2002/0131084 A1 * | 9/2002 | Andrew et al. | 358/1.16 |
| 2003/0206558 A1 * | 11/2003 | Parkkinen et al. | 370/477 |
| 2003/0219164 A1 | 11/2003 | Otsuka | |
| 2005/0200764 A1 * | 9/2005 | Tsuruta et al. | 348/716 |
| 2006/0139446 A1 | 6/2006 | Kuroki et al. | |

OTHER PUBLICATIONS

"Information Technology—Digital Compression and Coding of Continuous-Tone Still Images—Requirements and Guidelines: Recommendation T.81"; *Terminal Equipment and Protocols for Telematic Services*; The International Telegraph and Telephone Consultative Committee; Sep. 1992; pp. 1-182.

* cited by examiner

*Primary Examiner* — Duy M Dang
(74) *Attorney, Agent, or Firm* — Jason Tsai (57) ABSTRACT

A method and apparatus for compressing image data include a plurality of core encoders for receiving a respective plurality of streams of data in parallel and for compressing the received data, a plurality of output buffers for respectively receiving the compressed data from each of the plurality of core encoders, and a recombination circuit for recombining the compressed data.

12 Claims, 8 Drawing Sheets

METHOD AND APPARATUS FOR PARALLELIZATION OF IMAGE COMPRESSION ENCODERS

FIELD OF THE INVENTION

Disclosed embodiments relate generally to the field of data compression and, more particularly, to real-time high speed image compression.

BACKGROUND OF THE INVENTION

The transfer and storage of "real-time" data involves ever increasing bandwidth as the uses of electronic information continue to increase. Increased use of real-time data requires maximum transfer rates with minimum data loss or processing errors. Accordingly, interest in data compression has increased, both with respect to "lossless" data compression (in which excess data redundancy is eliminated without data loss) and to "lossy" compression, which removes redundant data as well as data judged to be "insignificant" according to criteria specific to the application.

Although substantial progress has been made in the development of lossless compression techniques, the amount of lossless compression possible in many applications is limited. For image compression, for example, a maximum compression ratio of 3:1 or less is typically realized. Lossy data compression techniques, on the other hand, are capable of substantially greater compression ratios in applications involving time series representations of analog signals (such as speech or music) and two-dimensional arrays representing images (e.g., still image, motion video). Thus, in these applications, a portion of the data can be thrown away with acceptable degradation of the signal after reconstruction.

Image processing applications are particularly suitable for lossy data compression techniques, since in many cases the image data sets are large. Images involve considerable redundancy and can be successfully compressed, using techniques such as the discrete cosine transform (DCT) in accordance with the JPEG (Joint Photographic Experts Group) standard. Compression ratios better than 10:1 without perceptual loss, and 20:1 or better with tolerable losses, can be achieved using the JPEG DCT compression or other JPEG compression techniques. Image compression using the JPEG standard is well known. Details of the JPEG standard are described in International Telecommunication Union Recommendation T.81, which is hereby incorporated by reference in its entirety.

Figure 1A:
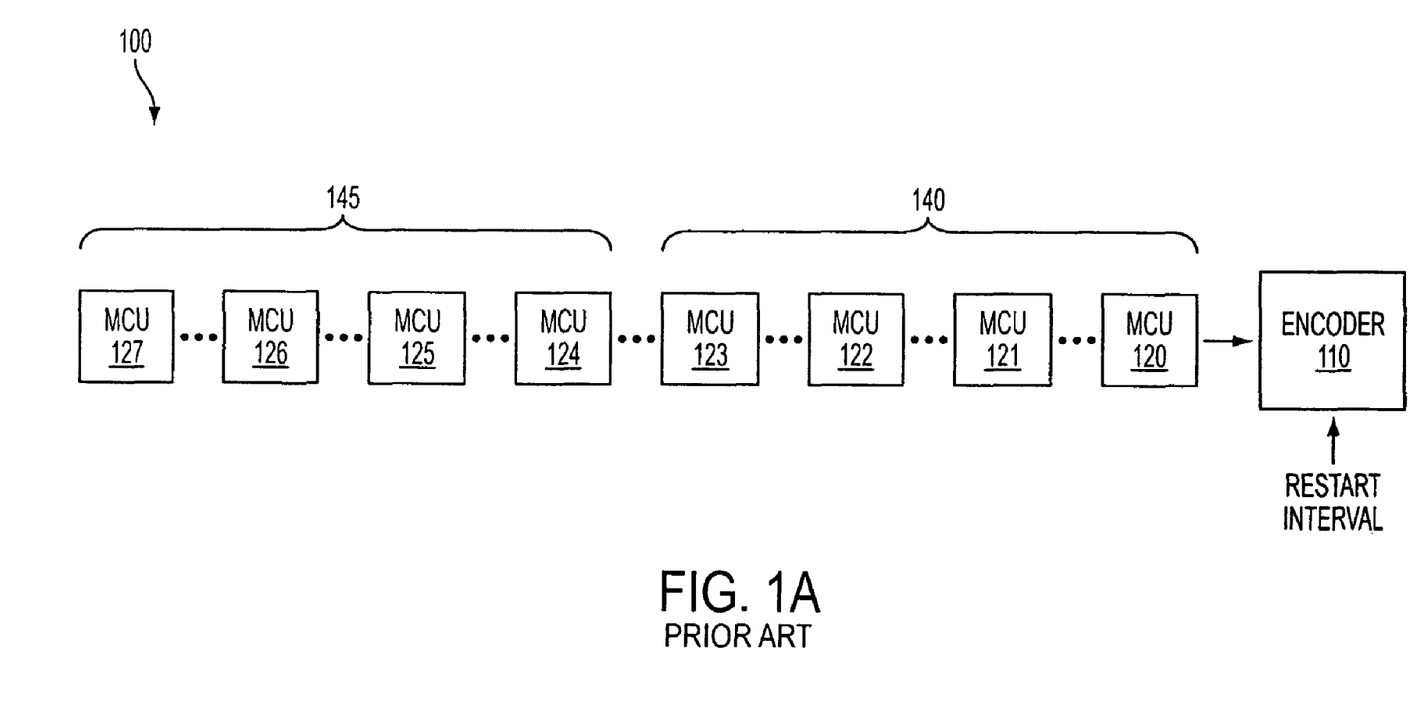
FIGS. 1A and 1B are block diagrams of a conventional JPEG encoder configuration.
Figure 1B:
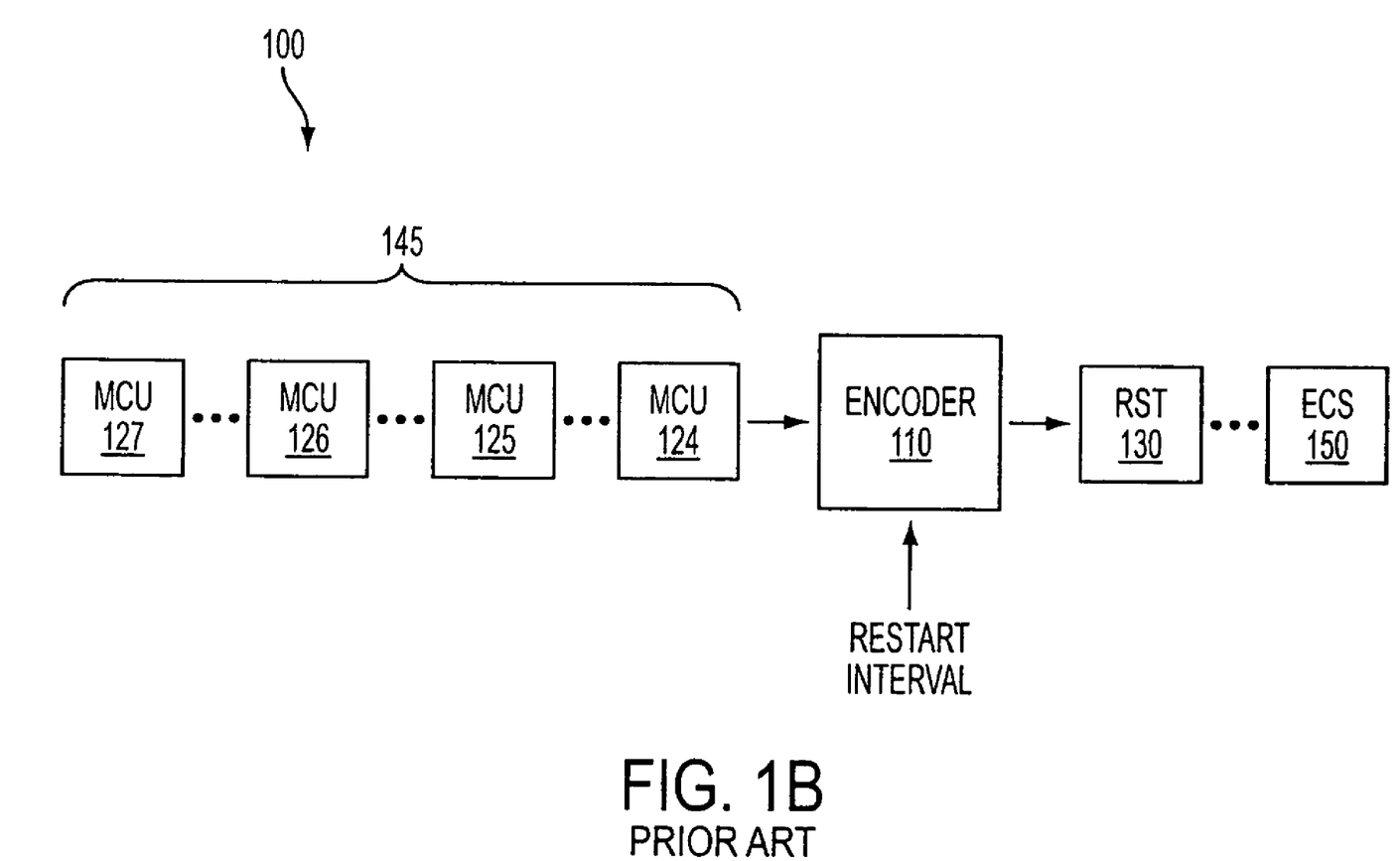

FIGS. 1A and 1B are block diagrams of a conventional JPEG encoder configuration 100. In general, a JPEG encoder 110 receives data packaged as a series of minimum coded units (MCUs) 120, 121, 122, 123, 124, 125, 126, 127. Each MCU is composed of four 8×8 blocks of pixel data in a 4:2:2 luminance/chrominance (YUV or YCbCr) color space. The composition of a MCU depends on the input image color format. As the human eye is more sensitive to luminance difference, the chrominance pixels are subsampled by 2:1 horizontally in YCbCr 4:2:2 format, and additionally subsampled by 2:1 vertically in YCbCr 4:2:0 format. Thus for every pair of blue chrominance (Cb) and red chrominance (Cr) pixels, there are two corresponding luminance (Y) pixels in YCbCr 4:2:2 format and four corresponding Y pixels in YCbCr 4:2:0 format. Therefore, each MCU is composed of two blocks of Y data (Y0 and Y1) and one block of Cb and one block of Cr in YCbCr 4:2:2 format and four blocks of Y data (Y0, Y1, Y2, and Y3) and one block of Cb and one block of Cr in YCbCr 4:2:0 format. Each block is composed of 8×8 pixels.

A JPEG encoder performs DCT transform, quantization and entropy encoding on each 8×8 block of the input image. The DC component of the DCT coefficients is differentially encoded. In differential encoding, previously encoded data is used as a prediction for the current to-be-encoded data, and the difference between the current data and the prediction is entropy encoded to further remove the redundancy among data thus to achieve higher compression ratio. The decoder needs to have all the previous data used as prediction available before it can decode the current data. More importantly, if an error, such as transmission error, occurs in the previous data, all data using those erroneous data as prediction will be corrupted. Therefore, resynchronization codes are introduced. The placement of resynchronization codes resets the prediction and fresh decoding can start after the resynchronization codes without any knowledge of previous data. Such resynchronization codes are called restart markers in JPEG. Restart markers are inserted by the encoder into a compressed bitstream periodically once per every predefined number of MCUs which is called restart interval. The restart markers is an input parameter to the JPEG encoder. In addition to isolation of data corruptions, restart markers also enable parallel encoding or decoding and provide some extend of random data access.

In the example shown in FIGS. 1A and 1B, the restart interval is 4, however, other restart intervals may be used. The MCUs are grouped into sets 140, 145 of four MCUs (e.g., set 140 includes MCUs 120-123; set 145 includes MCUs 124-127). Each MCU 120-127 is compressed by JPEG encoder 110 in the serial order in which the MCU 120-127 is received. FIG. 1A illustrates MCUs 120-127 before compression. FIG. 1B shows MCUs 120-123 already compressed, and MCUs 124-127 awaiting compression. Based on the position of the input data, the JPEG encoder 110 is able to identify the type of data (i.e., Y0, Y1, Cb, Cr) that is being compressed. The data is serialized and concatenated for each MCU in the set 140, 145, compressed according to the JPEG standard, padded with additional bits (if necessary to fill out byte space before any JPEG marker), and then output, for instance, to a memory (not shown), where all sets of compressed data may be recombined into entropy coded segments (ECSs). In the example shown, the MCU set 140 is compressed into an ECS 150. A restart marker 130 is inserted after ECS 150.

Such conventional JPEG encoder configurations 100 are limited in speed to the compression speed of the JPEG encoder 110, due to the serialized encoding of the entire stream of MCUs. This is insufficient for applications requiring a faster compression speed. Accordingly, there is a need and desire for a faster compression of data.

DETAILED DESCRIPTION OF THE INVENTION

In the following detailed description, reference is made to the accompanying drawings, which form a part hereof and show by way of illustration specific embodiments in which embodiments of the present invention may be practiced. These embodiments are described in sufficient detail to enable those skilled in the art to practice them, and it is to be understood that other embodiments may be utilized, and that structural, logical, processing, and electrical changes may be made. The progression of processing steps described is an example; however, the sequence of steps is not limited to that set forth herein and may be changed as is known in the art, with the exception of steps necessarily occurring in a certain order.

Figure 2:
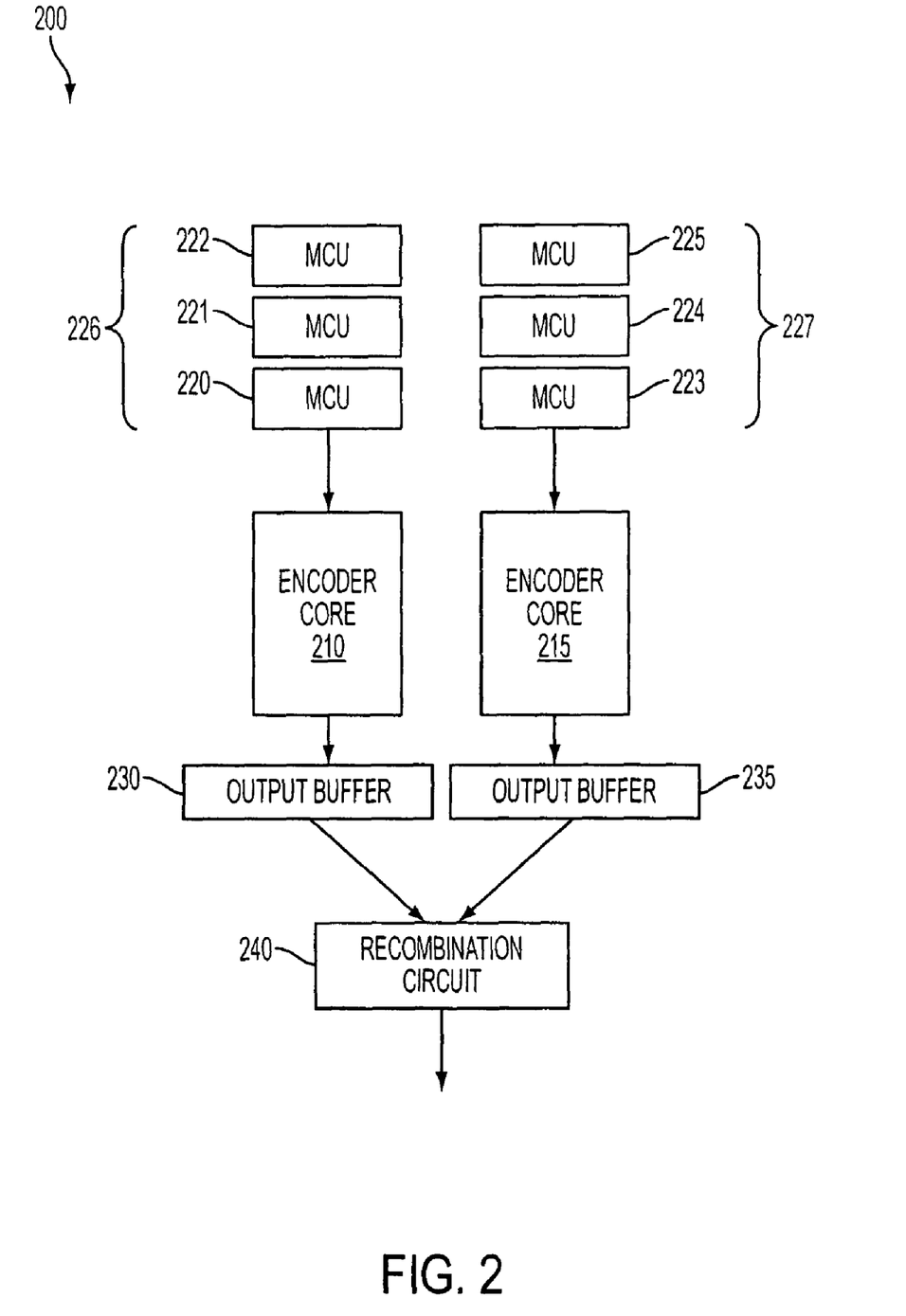
FIG. 2 is a block diagram of a data encoder configuration that may implement an embodiment described herein.

Now referring to the figures, where like numerals designate like elements, FIG. 2 is a block diagram of a data encoder configuration 200 that may implement an embodiment described herein. A stream of data, illustrated here, for example, as minimum coded units (MCUs) 220-225 are separated into parallel sets 226, 227 of a predetermined number of MCUs (set 226 includes MCUs 220-222; set 227 includes MCUs 223-225). Each set 226, 227 is composed of a number of MCUs which is equal to the restart interval. In the example shown, the restart interval, as an input parameter to the encoders, is 3.

Alternating sets 226, 227 are sent to respective encoder cores 210, 215, which may compress data according to the JPEG standard, although other compression methods may be used. Compression and differential encoding are performed by encoder cores 210, 215. The encoder cores compress the data in the sets 226, 227. The compressed data is output to respective output buffers 230, 235, which hold the data from each encoder core 210, 215 as respective entropy coded segments (ECSs). The ECS data from the respective sets 226, 227 are recombined in a recombination circuit 240 into a single stream of ECSs. The size of the output buffers 230, 235 may correspond to the length of the longest possible compressed bitstream of a restart interval worth of MCUs. An advantage to data encoder configuration 200 over configuration 100 is that the data may be compressed faster by a factor proportional to the number of parallel encoder cores 210, 215.

Figure 3:
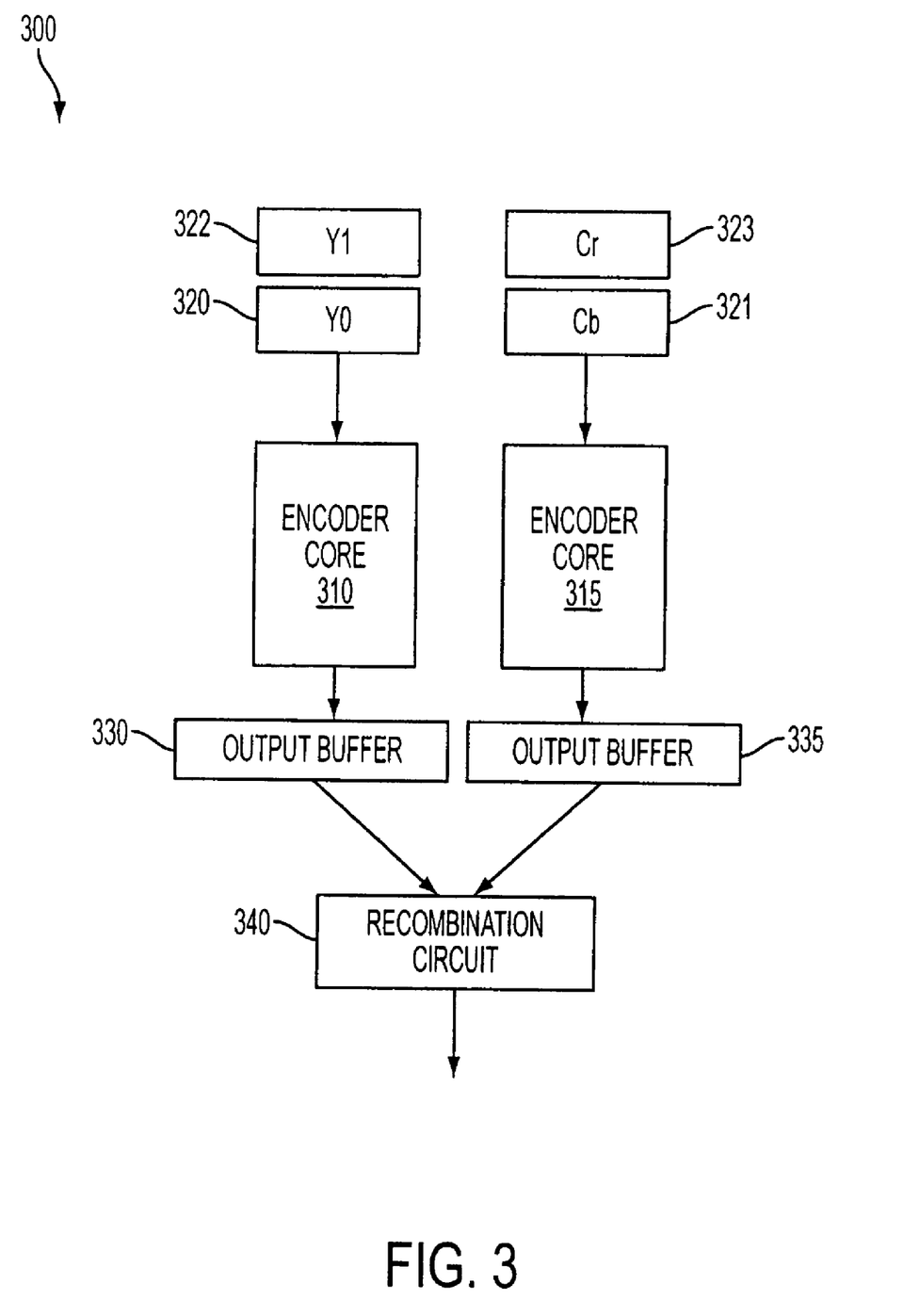
FIG. 3 is a block diagram of a data encoder configuration that may implement an embodiment described herein.

FIG. 3 is a block diagram of a data encoder configuration 300 that may implement an embodiment described herein. In this embodiment, each MCU (i.e., MCU 220 of FIG. 2) may be separated by a processor (not shown) into component luminance blocks 320, 321 (each including either Y0 or Y1 values) and chrominance blocks 322, 323 (each including either Cb or Cr values). This may provide a finer-grained operation than the embodiment shown in FIG. 2. The processor sends the separated blocks 320-323 to respective different encoder cores 310, 315.

In the illustrated embodiment, the luminance blocks 320, 322 may be sent to a first encoder core 310, and the chrominance blocks 321, 323 may be sent to a second core 315. Compression and differential encoding are performed by encoder cores 310, 315. Compressed data is output from each encoder core 310, 315 as ECSs to respective output buffers 330, 335. The ECS data from the respective output buffers 330, 335 are recombined in a recombination circuit 340 into a single stream of ECS data, corresponding to each original MCU (i.e., MCUs 220-225 of FIG. 2). The size of the output buffers 330, 335 may correspond to the length of the longest possible compressed bitstream of either all of the luminance or all of the chrominance blocks 320-323 of a MCU. If using the JPEG compression standard, the size of the output buffer 330, 335 would be 128 bytes, corresponding to two 8×8 blocks of data, i.e., Y0 and Y1, or Cb and Cr blocks, assuming the data is not expanded after encoding. An advantage to data encoder configuration 300 is that, if using the JPEG standard, insertion of the restart markers is not required. Additionally, the output buffers 330, 335 may be smaller than the above-described configurations 100, 200.

Boundary information relating to the bit length of the compressed data stream output from each encoder core 310, 315 may be provided for each block 320-323. The boundary information may assist the recombining circuit 340 in recombining the ECS data to match the luminance/chrominance pairs to create a stream of compressed data corresponding to each original MCU (i.e., MCUs 220-225 of FIG. 2). The boundary information may indicate the length of the compressed luminance or chrominance ECS, or may be a marker showing the end of the respective ECS data type. The boundary information may be output along with the last ECS byte transfer of the MCU to the output buffers 310, 315.

Figure 4:
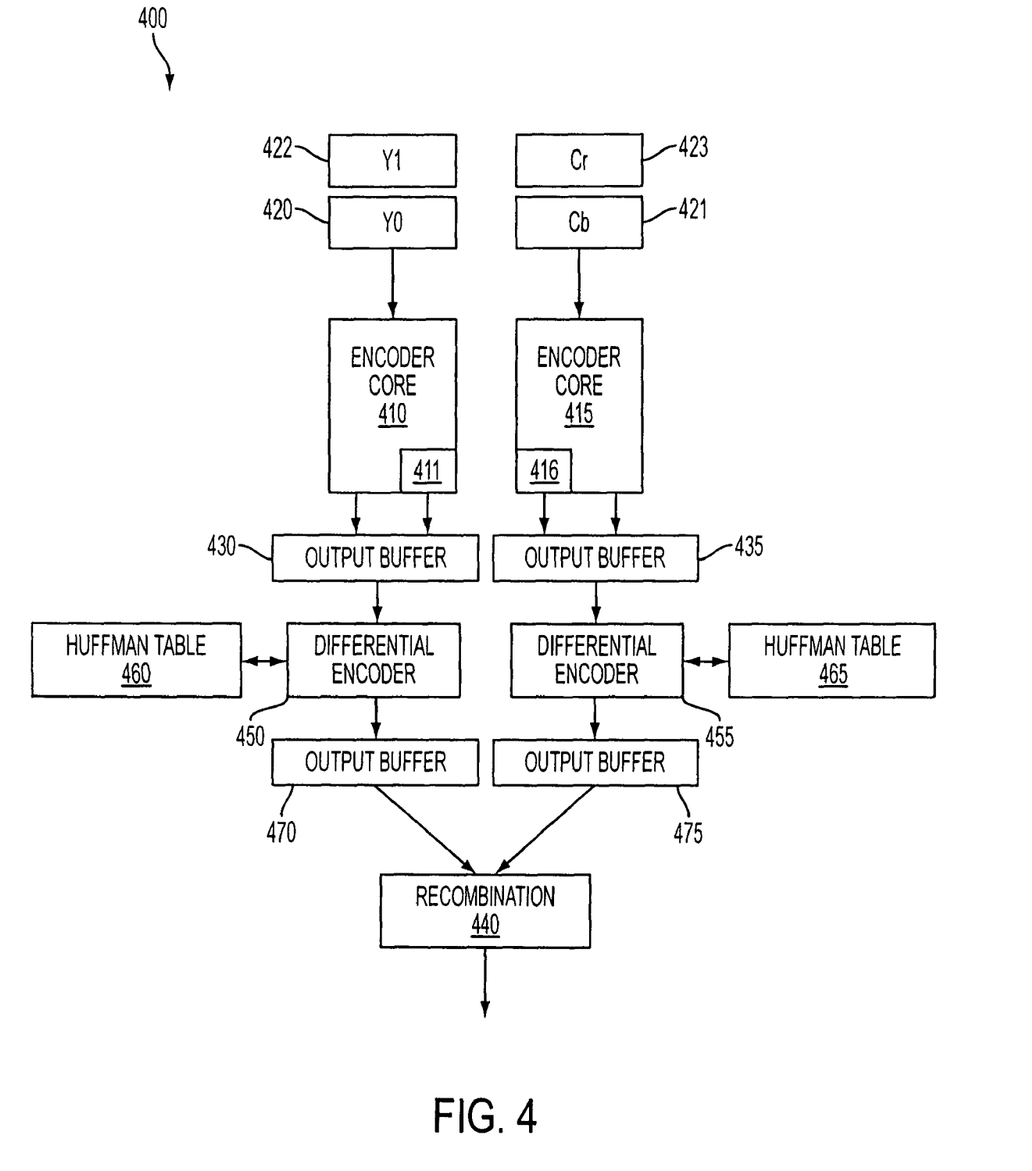
FIG. 4 is a block diagram of a data encoder configuration that may implement an embodiment described herein.

FIG. 4 is a block diagram of a data encoder configuration 400 that may implement an embodiment described herein. In this embodiment, the processor (not shown) also separates the MCUs (i.e., MCU 220 of FIG. 2) into individual component blocks 420-423 of respective Y0, Y1, Cb, and Cr data. Boundary information may be stored in a register 411, 416 (e.g., FIFO) in respective encoder cores 410, 415, and retrieved separately from the compressed output stream. A respective differential encoder 450, 455 and Huffman table 460, 465 are external to the encoder cores 410, 415, so that the encoder cores 410, 415 may perform compression without differential encoding. (For configurations 200, 300, the differential encoding is performed by the encoder cores 210, 215, 310, 315.) An explanation of Huffman tables may be found in International Telecommunication Union Recommendation T.81.

The encoder cores 410, 415 output compressed data to respective output buffers 430, 435. The size of the output buffers 430, 435 may correspond to the length of the longest possible compressed bitstream of Y0, Y1, Cb, or Cr block 420-423. If using the JPEG compression standard, the size of the output buffer 430, 435 would be 64 bytes, corresponding to one 8×8 block of data (i.e., Y0, Y1, Cb, or Cr block) assuming the data is not expanded after encoding. The output buffers 430, 435 send the compressed data to respective differential encoders 450, 455, which extract the DC component of the DCT coefficients of each block and use respective Huffman tables 460, 465 to perform differential encoding.

Alternatively, differential encoders 450, 455 may share a Huffman table 460. The differential encoders 450, 455 respectively output differentially encoded compressed data to the output buffers 470, 475, which then output the differentially encoded compressed data to the recombination circuit 440 for recombining the ECS data into a single stream of ECS data, corresponding to the each original MCU (i.e., MCUs 220-225 of FIG. 2). The size of the output buffers 470, 475 may correspond to the length of the longest possible compressed bitstream of either all of the luminance or all of the chrominance blocks 420-423 of a MCU. If using the JPEG compression standard, the size of the output buffer 470, 475 would be 128 bytes, corresponding to two 8×8 blocks of data, i.e., Y0 and Y1, or Cb and Cr blocks, assuming the data is not expanded after encoding.

Although the examples in FIGS. 3 and 4 are for a YCbCr 4:2:2 input image format, other formats may be applied similarly. For example, for a YCbCr 4:2:0 format, the four luminance blocks (Y0, Y1, Y2, Y3) may be input to one core, and the chrominance blocks (Cb, Cr) may be input to another core.

Figure 5:
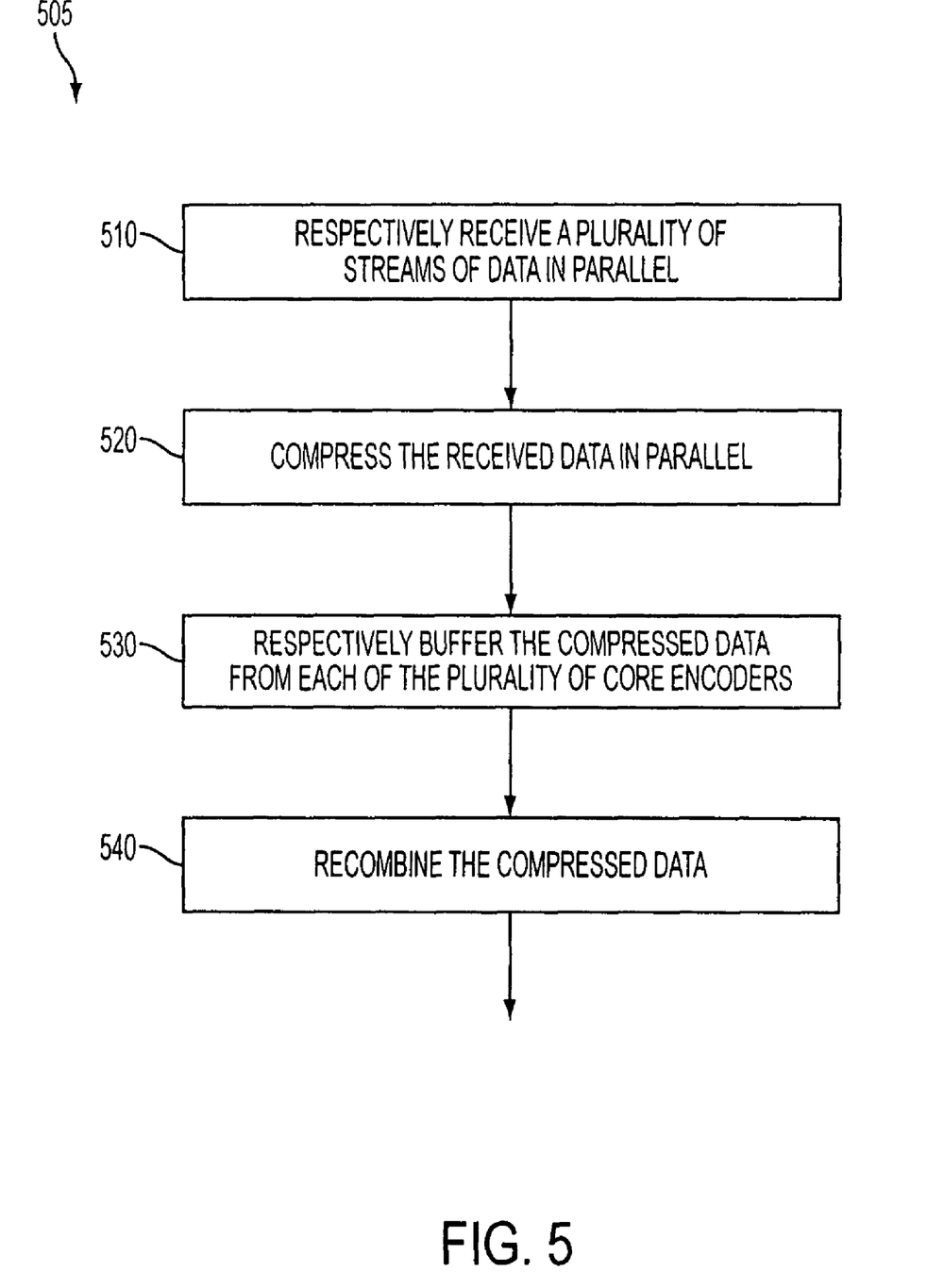
FIG. 5 is a flowchart of a method of compressing image data performed in accordance with an embodiment of the present invention.

FIG. 5 is a flowchart of a method 505 of compressing image data performed in accordance with an embodiment of the present invention. Step 510 includes respectively receiving, in parallel, a plurality of streams of data, such as MCUs 220-225 (FIG. 2), MCUs 320-323 (FIG. 3), or MCUs 420-423 (FIG. 4). Step 520 includes compressing, in parallel, the received data. This step may be performed, for example, in encoder cores 210, 215, 310, 315, 410, 415 (FIGS. 2-4). Step 530 includes respectively buffering the compressed data from each of the plurality of core encoders, such as with output buffers 230, 235, 330, 335, 430, 435, 470, 475 (FIGS. 2-4). Step 540 includes recombining the compressed data, for example, in recombination circuit 240, 340, 440 (FIGS. 2-4).

Figure 6:
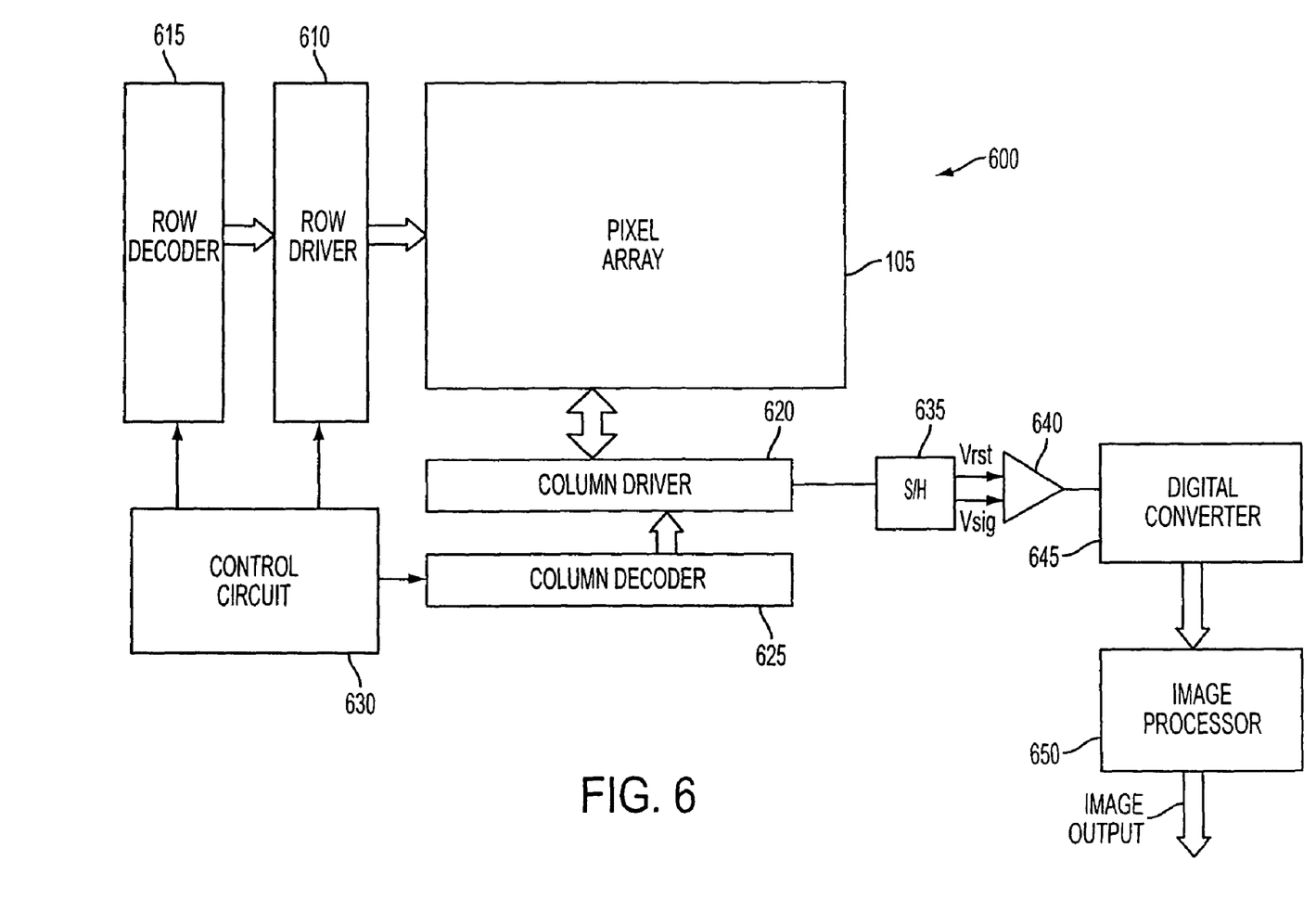
FIG. 6 is a block diagram of an imager device that can be used with any of the FIGS. 2-4 data encoder configurations.

FIG. 6 illustrates a block diagram of an imager device 600 having a pixel array 605. Pixel array 605 comprises a plurality of pixels arranged in a predetermined number of columns and rows (not shown). The pixels of each row in array 605 are all turned on at the same time by a row select line, and the pixels of each column are selectively output by respective column select lines. A plurality of row and column lines are provided for the entire array 605. The row lines are selectively activated in sequence by a row driver 610 in response to row address decoder 615. The column select lines are selectively activated in sequence for each row activation by a column driver 620 in response to column address decoder 625. Thus, a row and column address is provided for each pixel.

The imager 600 is operated by a control circuit 630, which controls address decoders 615, 625 for selecting the appropriate row and column lines for pixel readout. Control circuit 630 also controls the row and column driver circuitry 610, 620 so that they apply driving voltages to the drive transistors of the selected row and column lines. The pixel output signals typically include a pixel reset signal Vrst taken off of the storage region when it is reset by the reset transistor and a pixel image signal Vsig, which is taken off the storage region after photo-generated charges are transferred to it. The Vrst and Vsig signals are read by a sample and hold circuit 635 and are subtracted by a differential amplifier 640, to produce a differential signal Vrst−Vsig for each pixel. Vrst−Vsig represents the amount of light impinging on the pixels. This difference signal is digitized by an analog-to-digital converter 645. The digitized pixel signals are fed to an image processor 650 to form a digital image output. Image processor 650 includes a data encoder configuration as described in any of FIGS. 2-4, or method 505 of FIG. 5, or the data encoder may be separately provided downstream of image processor 650. The digitizing and image processing can be located on or off the imager chip. In some arrangements the differential signal Vrst−Vsig can be amplified as a differential signal and directly digitized by a differential analog to digital converter.

Figure 7:
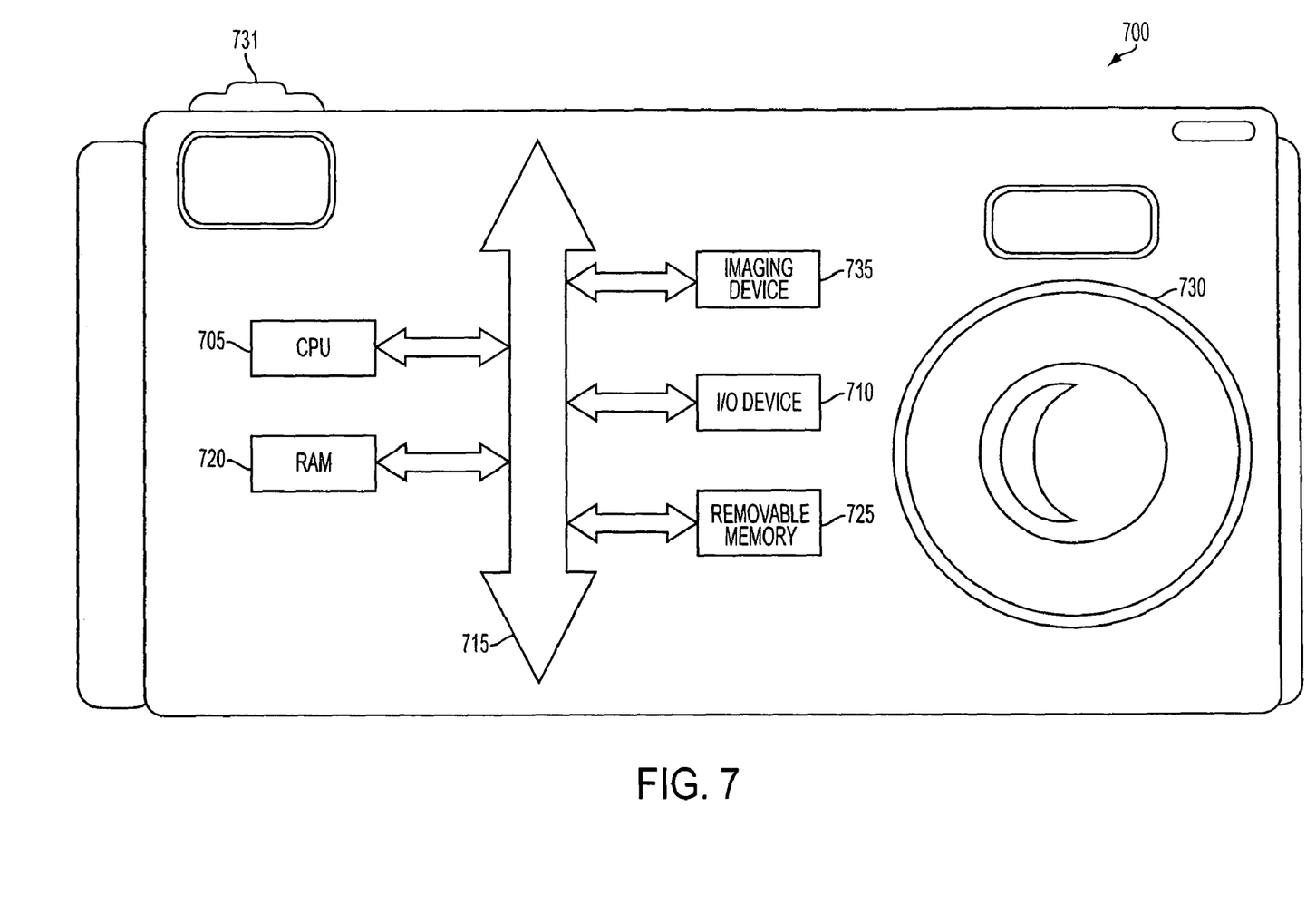
FIG. 7 is an embodiment of a camera system that can be used with the FIG. 6 imaging device.

FIG. 7 is an embodiment of a camera system which can be used with an imaging device 735 having an encoder configuration implementing an embodiment of the invention of FIGS. 2-5. Camera system 700, for example, a still or video camera system, generally comprises a lens 730 for focusing an incoming image on pixel array 105 when shutter release button 731 is depressed, and a central processing unit (CPU) 705, such as a microprocessor for controlling camera operations, that communicates with one or more input/output (I/O) devices 710 over a bus 715. Imaging device 735 also communicates with the CPU 705 over bus 715. The system 700 also includes random access memory (RAM) 720, and can include removable memory 725, such as flash memory, which also communicate with CPU 705 over the bus 715. Imaging device 735 may be combined with a processor, such as a CPU, digital signal processor, or microprocessor, with or without memory storage on a single integrated circuit or on a different chip than the processor.

The camera system 700 is an example of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

The processes and devices in the above description and drawings illustrate examples of methods and devices of many that could be used and produced to achieve the objects, features, and advantages of embodiments described herein. For instance, it should be appreciated that embodiments are not limited to the JPEG compression standard, but may be applied to any compression using parallel processing. It should also be appreciated that embodiments may include any compressed bitstream or compressed format as an output, and not only an ECS or JPEG-specific format. In addition, any variable length code which could be used for entropy coding could be substituted for the Huffman tables. Embodiments are not limited to YCbCr format, but may employ Red/Green/Blue (RGB) or any other suitable format. Nor are embodiments limited to the order of data input described herein. Furthermore, embodiments are not limited to use in image capture devices. Thus, the processes and devices are not to be seen as limited by the foregoing description of the embodiments, but only limited by the appended claims.

What is claimed as new and desired to be protected by Letters Patent of the United States is:

1. An apparatus for compressing image data from an imager, comprising:
    a plurality of core encoders for receiving a respective plurality of streams of data in parallel from the imager and for compressing the received data;
    a plurality of output buffers for respectively receiving the compressed data from each of the plurality of core encoders;
    a recombination circuit for recombining the compressed data, wherein each of the plurality of streams of data comprises one of luminance values and chrominance values, wherein the luminance values comprise a first set of luminance values and a second set of luminance values, and wherein the chrominance values comprise blue chrominance values and red chrominance values;
    a plurality of differential encoders for respectively receiving an output of the plurality of output buffers and for outputting differentially encoded data to a respective plurality of pre-recombination buffers; and
    at least one Huffman table coupled to the plurality of differential encoders, wherein the plurality of pre-recombination buffers outputs to the recombination circuit.

2. The apparatus of claim 1, wherein the plurality of core encoders compresses the data according to a JPEG (Joint Photographic Experts Group) standard.

3. The apparatus of claim 1, wherein each of the plurality of streams of data comprises at least one minimum coded unit.

4. The apparatus of claim 3, wherein the at least one minimum coded unit comprises four sets of pixel image data, the sets comprising first and second luminance values, blue chrominance values, and red chrominance values.

5. The apparatus of claim 1, wherein each of the plurality of streams of data comprises a plurality of minimum coded units.

6. The apparatus of claim 5, wherein each of the plurality of streams of data further comprises at least one restart marker.

7. The apparatus of claim 6, wherein the plurality of minimum coded units are separated by the at least one restart marker into a plurality of sets of equal numbers of minimum coded units.

8. The apparatus of claim 1, wherein:
    at least a first of the plurality of core encoders is configured to receive the luminance values; and
    at least a second of the plurality of core encoders is configured to receive the chrominance values.

9. A method of compressing image data from an imager comprising:
    respectively receiving, in parallel, a plurality of streams of data each of which is associated with a respective portion of the image data;
    compressing, in parallel, the received data;
    respectively buffering the compressed data from each of a plurality of core encoders;
    recombining the compressed data, wherein each of the plurality of streams of data comprises one of luminance values and chrominance values, wherein the luminance values comprise a first set of luminance values and a second set of luminance values, and wherein the chrominance values comprise blue chrominance values and red chrominance values;
    respectively outputting the compressed data to a plurality of output buffers;
    respectively outputting the buffered compressed data to a plurality of differential encoders;
    differentially encoding the compressed data using at least one Huffman table coupled to the plurality of differential encoders;
    respectively outputting the differentially encoded data to a plurality of pre-recombination buffers; and
    outputting the pre-recombination buffered differentially encoded data to a recombination circuit.

10. The method of claim 9, wherein each of the plurality of streams of data comprises at least one minimum coded unit.

11. The method of claim 9, wherein each of the plurality of streams of data comprises a plurality of minimum coded units.

12. The method of claim 9, further comprising:
    receiving the luminance values with at least a first of the plurality of core encoders; and
    receiving the chrominance values with at least a second of the plurality of core encoders.

* * * * *